US012762375B2

(12) United States Patent
Shi et al.

(10) Patent No.: US 12,762,375 B2
(45) Date of Patent: Oct. 13, 2026

(54) TECHNIQUES FOR MATCHING DISPARATE INPUT DATA

(71) Applicant: Visa International Service Association, San Francisco, CA (US)

(72) Inventors: Yichun Shi, Haslett, MI (US); Lacey Best-Rowden, San Mateo, CA (US); Kim Wagner, Sunnyvale, CA (US)

(73) Assignee: Visa International Service Association, San Francisco, CA (US)

( * ) Notice: Subject to any disclaimer, the term of this patent is extended or adjusted under 35 U.S.C. 154(b) by 1151 days.

(21) Appl. No.: 17/267,435

(22) PCT Filed: Aug. 9, 2019

(86) PCT No.: PCT/US2019/046019
§ 371 (c)(1),
(2) Date: Feb. 9, 2021

(87) PCT Pub. No.: WO2020/033902
PCT Pub. Date: Feb. 13, 2020

(65) Prior Publication Data

US 2021/0312263 A1 Oct. 7, 2021

Related U.S. Application Data

(60) Provisional application No. 62/717,630, filed on Aug. 10, 2018.

(51) Int. Cl.
*G06N 7/01* (2023.01)
*G06N 3/045* (2023.01)
(Continued)

(52) U.S. Cl.
CPC ............. *G06N 3/045* (2023.01); *G06N 3/047* (2023.01); *G06N 3/088* (2013.01); *G06N 7/01* (2023.01)

(58) Field of Classification Search
CPC .. G06N 3/00; G06N 5/00; G06N 7/00; G06N 10/00; G06N 20/00; G06N 99/00
See application file for complete search history.

(56) References Cited

U.S. PATENT DOCUMENTS

2016/0148041 A1 5/2016 Kim et al.
2017/0118207 A1 4/2017 Madhu et al.
(Continued)

FOREIGN PATENT DOCUMENTS

CN 107564580 A 1/2018
CN 108197557 A 6/2018
(Continued)

OTHER PUBLICATIONS

Yichun Shi, & Anil K. Jain. (2018). DocFace: Matching ID Document Photos to Selfies. (Year: 2018).*
(Continued)

*Primary Examiner* — Kakali Chaki
*Assistant Examiner* — Johnathan R Germick
(74) *Attorney, Agent, or Firm* — Kilpatrick Townsend & Stockton LLP

(57) ABSTRACT

Systems and methods are disclosed for training a generative adversarial network (GAN) to transform images of one type (e.g., a selfie) to images of a second type (e.g., an ID document image). Once trained, the GAN may be utilized to generate an augmented training set that includes pairs of images (e.g., an image of the first type paired with an image of the second type, an image of the second type generated from an image of the first type paired with an image of the second type). The augmented training data set may be utilized to train a matching model to identify when subsequent input images (e.g., a selfie and an ID image, an ID image generated from a selfie and an actual ID image) match.

15 Claims, 7 Drawing Sheets

(51) Int. Cl.
*G06N 3/047* (2023.01)
*G06N 3/088* (2023.01)

(56) References Cited

U.S. PATENT DOCUMENTS

| | | | | |
|---|---|---|---|---|
| 2017/0300783 | A1 | 10/2017 | Kumar et al. | |
| 2019/0128989 | A1* | 5/2019 | Braun | G06N 5/046 |

FOREIGN PATENT DOCUMENTS

| | | | |
|---|---|---|---|
| CN | 108352024 | A | 7/2018 |
| KR | 101013139 | | 2/2011 |
| KR | 20150100683 | | 9/2015 |

OTHER PUBLICATIONS

Jun-Yan Zhu, Taesung Park, Phillip Isola, & Alexei A. Efros. (2018). Unpaired Image-to-Image Translation using Cycle-Consistent Adversarial Networks. (Year: 2018).*

Xinyue Zhu, Yifan Liu, Zengchang Qin, & Jiahong Li. (2017). Data Augmentation in Emotion Classification Using Generative Adversarial Networks. (Year: 2017).*

Weijian Deng, Liang Zheng, Qixiang Ye, Guoliang Kang, Yi Yang, & Jianbin Jiao. (2018). Image-Image Domain Adaptation with Preserved Self-Similarity and Domain-Dissimilarity for Person Re-identification (Year: 2018).*

Subramaniam, A., Chatterjee, M., & Mittal, A. (2016). Deep Neural Networks with Inexact Matching for Person Re-Identification. In Advances in Neural Information Processing Systems. Curran Associates, Inc . . . (Year: 2016).*

Cycada: Cycle-Consistent Adversarial Domain Adaptation Judy Hoffman, Eric Tzeng, Taesung Park, Jun-Yan Zhu, Phillip Isola, Kate Saenko, Alexei A. Efros, & Trevor Darrell. (2017). CyCADA: Cycle-Consistent Adversarial Domain Adaptation. (Year: 2017).*

X. Qu, X. Wang, Z. Wang, L. Wang and L. Zhang, "Perceptual-DualGAN: Perceptual Losses for Image to Image Translation with Generative Adversarial Nets," 2018 International Joint Conference on Neural Networks (IJCNN), Rio de Janeiro, Brazil, 2018, pp. 1-8, doi: 10.1109/IJCNN.2018.8489108 (Year: 2018).*

Li, T., Qian, R., Dong, C., Liu, S., Yan, Q., Zhu, W., & Lin, L. (2018). BeautyGAN: Instance-level Facial Makeup Transfer with Deep Generative Adversarial Network. In Proceedings of the 26th ACM International Conference on Multimedia (pp. 645-653). Association for Computing Machinery. (Year: 2018).*

Chartsias et al., "Adversarial Image Synthesis For Unpaired Multi-Modal Cardiac Data", Advances In Biometrics, Sep. 26, 2017, pp. 3-13.

Application No. EP19848416.4 , Extended European Search Report, Mailed On Mar. 23, 2022, 11 pages.

Shi et al., "DocFace: Matching ID Document Photos To Selfies", International Conference On Biometrics Theory, Applications And Systems (BTAS), Available online at: https://arxiv.org/pdf/1805.02283.pdf, May 6, 2018, 8 pages.

Application No. PCT/US2019/046019 , International Search Report and Written Opinion, Mailed On Dec. 12, 2019, 13 pages.

Seo et al., "Unpaired Image-to-Image Translation using Cycle-Consistent Adversarial Networks", CycleGAN, Deep learning/GAN. Retrieved from Internet: https://wewinserv.tistory.com/66, Jul. 19, 2018, 6 pages.

Office Action, mailed Feb. 22, 2024, for Chinese Patent Application No. CN201980053560.4, 14 pages.

Office Action, mailed Jun. 26, 2024, for European Patent Application No. EP19848416.4, 5 pages.

Notice of Decision to Grant, mailed Jan. 19, 2024, for Singapore Patent Application No. SG11202101136U, 4 pages.

Application No. CN201980053560.4 , Office Action, Mailed On Oct. 17, 2024, with English Language Summary, 22 pages.

* cited by examiner

400

500

TECHNIQUES FOR MATCHING DISPARATE INPUT DATA

CROSS-REFERENCE TO RELATED APPLICATIONS

This application is a 371 National Stage of International Patent Application No. PCT/US2019/46019 which claims priority from U.S. Provisional Patent Application No. 62/717,630, filed on Aug. 10, 2018, the disclosures of which are incorporated by reference herein in their entireties.

BACKGROUND

Numerous activities in daily life, including transactions, access to services, and transportation, require individuals to verify their identity by showing identification (ID) documents (e.g., a passport, a driver's license, etc.). Typically, a human being is required to verify that the identification documents match the person standing before them. An automated system for matching ID documents to live people in real time would speed up the verification process and remove the burden on human operators. However, there are several unique challenges to providing such a system. By way of example, ID document images typically are low quality due to compression. Watermarks and/or glare in an ID image can also make analysis and processing of the image difficult.

Embodiments of the invention address these and other problems, individually and collectively.

BRIEF SUMMARY

Embodiments of the present invention are directed to methods, systems, devices, and computer readable media that can be used to accurately match an image of an ID document and an image of the ID document holder. By way of example, a user could capture a self-portrait image utilizing an image capture device (e.g., a camera of his smartphone, a camera provided at a kiosk, etc.). The user may further provide capture and/or scan an image of his ID document (e.g., by taking a picture of his ID with the camera of his smartphone, by utilizing a scanner and/or a camera provided at a kiosk, etc.). Utilizing the techniques provided herein, a data processing computer can be utilized to match the ID document image to the self-portrait image to determine whether the images depict the same person with a high degree of accuracy.

One embodiment of the invention is directed to a method comprising, receiving, by the data processing computer, input data comprising a first input image and a second input image. The method may further comprise providing, by the data processing computer, the first input image and the second input image as input to the machine-learning model. In some embodiments, the machine learning model may be trained by: i) obtaining, by a data processing computer, an initial training set comprising a first set of images of a first type and a second set of images of a second type, ii) training a neural network to generate output images of the second type from input images of the first type, iii) generating, by the data processing computer, an augmented training set based at least in part on the first set of images of the first type and the neural network, and iv) training, by the data processing computer, the machine-learning model to identify whether two input images match, the machine-learning model being trained utilizing the augmented training set. The method may further comprise executing, by the data processing computer, at least one operation in response to receiving output of the machine-learning model indicating the first input image matches the second input image.

Another embodiment of the invention is directed to a data processing computer. The data processing computer can comprise one or more processors and one or more memories storing computer-executable instructions, wherein executing the computer-executable instructions by the one or more processors, causes the data processing computer to perform the method described above.

In some embodiments, the neural network may comprise a cycle-consistent adversarial network, and training the neural network may comprise training a first neural network to generate output images of the first type from input images of the second type and training a second neural network to generate output images of the second type from input images of the first type. In some embodiments, the neural network is a cycle-consistent generative adversarial network. As described herein, a cycle-consistent generative adversarial network may further comprise corresponding first and second discriminator networks. The first discriminator network may be configured to identify whether the generated output images of the first type are generated or genuine and the second discriminator network may be configured to identify whether generated output images of the second type are generated or genuine.

In some embodiments, the method may further comprise validating the first neural network by: providing a first set of input images of a first type to the first neural network to obtain a generated set of images of the second type, providing the generated set of images of the second type to generate a second generated set of images of the first type, and comparing the first set of input images of the first type to the second generated set of images of the first type.

In some embodiments, the first set of images and the second set of images may be unpaired in the initial training set. The augmented training set may comprise pairs of images. By way of example, a pair of images of the augmented training set may comprise a first image of the first set of images and a second image generated by the neural network from the first image. In some embodiments, the first image may be of the first type and the second image may be of the second type.

In some embodiments, training the machine-learning model to identify whether two input images match may comprise training the machine-learning model using the pairs of images of the augmented training set and a supervised learning algorithm.

In some embodiments, the augmented training set may comprise pairs of images, each pair comprising two images of the second type. At least one pair of images may comprise an image generated by the neural network from one of the first set of images.

In some embodiments, the method may further comprise transforming the first input image received as input data from the first type to the second type utilizing the neural network. The first input image may be transformed prior to providing the first input image and the second input image as input to the machine-learning model.

In some embodiments, the first set of images comprise user captured self-portrait images (e.g., "selfies" captured with a camera of the user's device, portrait images captured by another device such as a kiosk or camera provided by another entity, etc.) and wherein the second set of images comprises images captured from an identification card.

These and other embodiments of the invention are described in further detail below, with reference to the figures.

DETAILED DESCRIPTION

Figure 1:
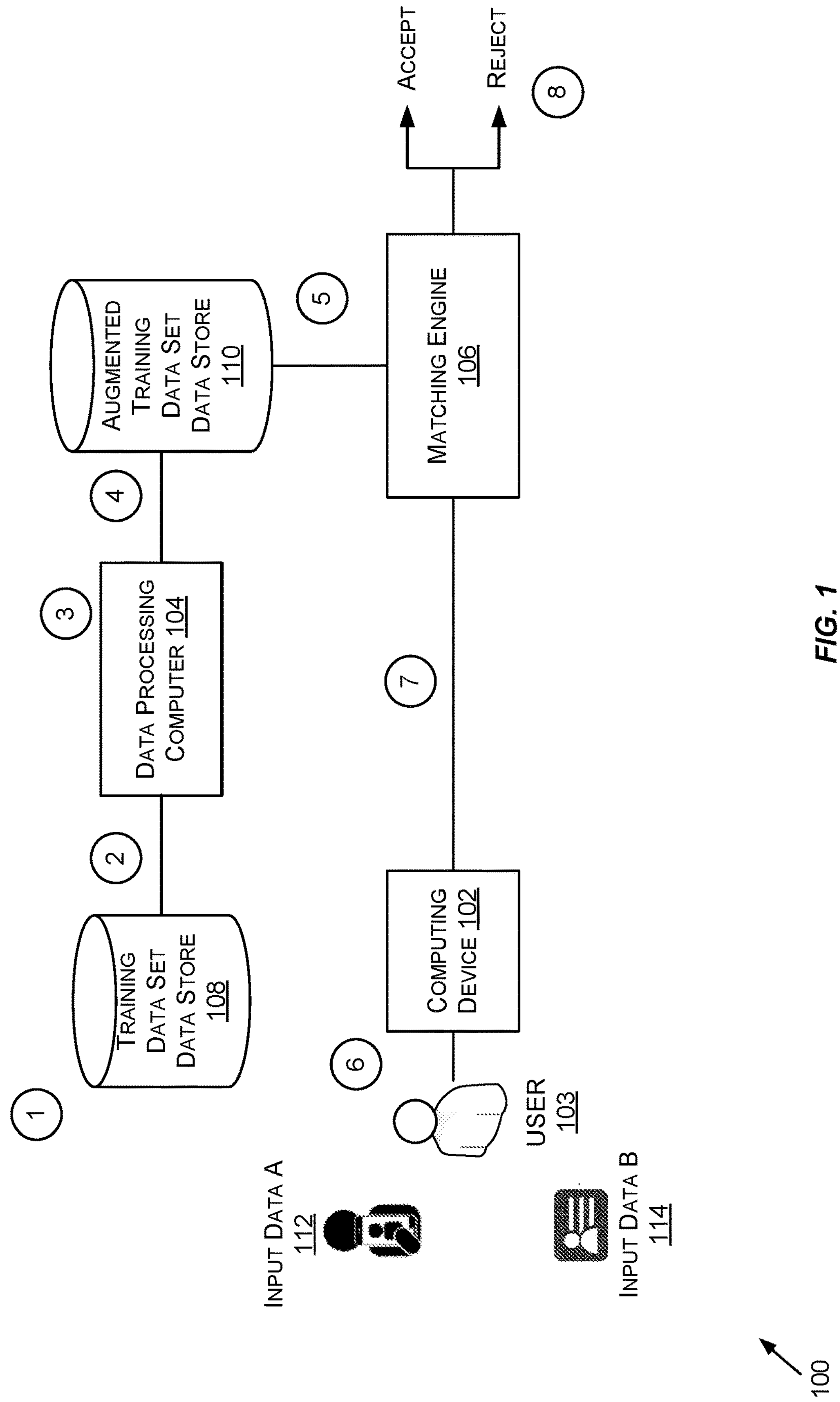
FIG. 1 shows a block diagram of an exemplary system and method for matching disparate input data, according to some embodiments.

As described above, individuals may be required to provide identification (ID) documents such as a passport, driver's license, state issued ID card, or the like to verify their identify. For example, when boarding a plane, an individual may be required to present their ID with their plane ticket at a security checkpoint. Conventionally, a human being (e.g., a security agent) is required to verify that the person standing before them is the same person depicted on the ID document. This can cause the process of verifying identify to be tedious, leading to frustration and potentially negative consequences for the person being verified.

Automating this process is not straight forward. While users can now easily provide an image of themselves and/or their ID document utilizing, for example, a camera on their smartphone. It is not a simple task to determine whether the image of the person matches the image depicted on the ID document. The image of the ID document can be of low quality or may include watermarks and/or glare. Additionally, due to privacy issues, data sets including known portrait image/ID document image pairs are difficult to procure.

The processes described herein can be used to provide an efficient process for accurately determining whether an image of a person matches an image of an ID in real time and with high accuracy. Utilizing these techniques can speed up the verification process and remove the burden on human operators.

Before discussing detailed embodiments of the invention, some descriptions of certain terms may be useful.

A "computing device" may be any suitable electronic device operated by a user. A user device may be, for example, a smart phone, smart watch, laptop, desktop, or game console. In some cases, the computing device may be owned by the user or provided by another entity.

A "neural network" is a type of machine learning network which is modeled after the human brain. This type of artificial neural network provides an algorithm that allows the computer to learn by incorporating new data. Neural networks may include many perceptrons which each accomplish simple signal processing and which are connected to one another in a large mesh network. Neural networks cannot be programmed directly for a task. Rather, they learn the information utilizing supervised learning and/or unsupervised learning.

"Supervised learning" is a type of machine learning algorithm that uses a labeled data set to learn a mapping function between input variables and output variables. The goal is to approximate the mapping function such that the output variable can be predicted from new input data. Some example supervised learning algorithms include linear regression, random forest, and support vector machines.

"Unsupervised learning" is a type of machine learning algorithm that models the underlying structure or distribution of a data set in order to learn more about the data. In unsupervised learning, the data set has only input data and no output data is known ahead of time. Some example unsupervised learning algorithms include k-means clustering and the Apriori algorithm.

A "convolutional neural network" is a type of neural network which can take an image as input and assign importance (e.g., learnable weights/biases) to various aspects/objects in the image. Convolutional neural networks can be utilized in image processing, image classification, and facial recognition systems.

A "generative adversarial network" (GAN) are used for generative modeling using deep learning methods such as convolutional neural networks. Generative modeling is an unsupervised learning task in machine learning that involves automatically discovering and learning the regularities or patterns in input data in such a way that the model can be used to generate or output new examples that plausibly could have been drawn from the original data set. A GAN includes two sub-models, a generator model trained to generate new data examples, and a discriminator model that is trained to classify examples as either real or fake. The two models are trained together in a zero-sum game, adversarial, until the discriminator model is fooled over some threshold percent of the time, meaning the generator model is generating plausible examples.

A "cycle-consistent generative adversarial network," also called a "cycleGAN" is a type of generative adversarial network that uses two generative models and two discriminator models. A cycleGAN can be utilized in image-to-image translation to learn a function for transforming an input image from one domain to another. As a non-limiting example, a cycleGAN can be used to learn how to alter an image of a zebra to depict an image of a horse. A cycleGAN learns this function with a training data set that includes unpaired data. In other words, the training data set may include a collection of images of a first domain (e.g., zebras) and a collection of images of a second domain (e.g., horses), but the images of the first domain (e.g., a particular zebra) are not paired or otherwise associated with images of the second domain (e.g., a particular horse). Additional information related to cycleGAN can be found in "Unpaired Image-to-Image Translation using Cycle-Consistent Adversarial Networks, by Zhu, Park, Isla, Efros, https://arxiv.org/pdf/1703.10593.pdf, published Nov. 15, 2018, the contents of which are incorporated by reference.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

FIG. 1 shows a block diagram of an exemplary system 100 and method for matching disparate input data, according to some embodiments. The system 100 may be used to facilitate data communications between the various computers depicted in FIG. 1. The system 100 includes a computing device 102, a data processing computer 104, a matching engine 106, a training data set data store 108, and an augmented training data set data store 110. In some embodiments, the matching engine 106 may be a component of the data processing computer 104. The training data set data store 108 and the augmented training data set data store 110 may be the same data store or disparate data stores. In some embodiments, the computing device 102 and the data processing computer 104 may be one and the same. Each of these systems and computers may be in operative communication with each other. By way of example, these systems and computers may communicate via one or more data networks such as, but not limited to, the Internet, wireless communication networks, cellular communication networks, or the like. In general, the components in FIG. 1 may communicate via any suitable communication medium, using any suitable communications protocol. For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

The data processing computer 104 may be in any suitable form. For example, the data processing computer 104 may be a server computer configured to provide the functionality discussed herein. In some embodiments, the data processing computer 104 can be a computing device such as a laptop, desktop, kiosk, smartphone, tablet computer, or the like. In some embodiments, the data processing computer 104 may be configured to obtain input data such as input data 112 and 114 discussed in more detail below. By way of example, the data processing computer 104 can be configured with one or more image capture devices such as a camera, a scanner, or the like.

The computing device 102 may likewise be in any suitable form. For example, the computing device 102 may be a smartphone, a personal digital assistant (PDA), a tablet computer, a laptop, a desktop computer, a digital camera, or the like. In some embodiments, the computing device 102 can be configured with, or configured to access, one or more image capture devices such as a camera, a scanner, or the like.

As a non-limiting example, the data processing computer 104 may be a server computer operated on behalf of an entity (e.g., a security organization at an airport or transit station, a merchant, a government agency, or the like). For the sake of illustration, the data processing computer may be a server computer operating on behalf of a security organization responsible for verifying identities of passengers at security checkpoints in an airport. Utilizing the method discussed in connection with FIG. 1, a method for verifying a passenger's identity is provided.

The method may begin at step 1, where a training data set may be obtained and stored in the training data set data store 108. In some embodiments, the training data set may include a collection of images of a first type (e.g., images of people including at least a portion of the persons face (hereinafter referred to as "portrait images")). These images may be self-captured by the subject of the images (sometimes referred to as a "selfie") or the images may be captured by persons/devices different from the subject of the images. The training data set may further include a collection of images of a second type (e.g., ID documents or portions of ID documents including an image of a person). As used herein, ID documents are intended to refer to passports, driver's licenses, state-issued identification cards, debit and/or credit cards, or any suitable document that includes an image of the document holder. The training data set contained in the training data set data store 108 may include few or no image pairs. That is, the images of the first type may not be paired or otherwise associated with the images of the second type. The training data set may be provided by any suitable source (e.g., a user of the data processing computer 104). In some embodiments, the training data set may be obtained utilizing a web crawler or other data collection algorithm that can visit various websites on the Internet to identify images of people and/or images of ID documents. The number of portrait images need not equal the number of ID document images in the training data set, although these sets could have an equal number of images.

At step 2, the data processing computer 104 may retrieve the training data set and initiate a process for training a generative adversarial network such as a cycleGAN. Utilizing the training data set obtained from the training data set data store 108, the data processing computer 104 may train the cycleGAN to identify two transformation functions. One transformation function may specify operations to be performed to transform an image of the first type (e.g., a portrait image) into an image of the second type (e.g., an ID document image). The second transformation function may specify operations to be performed to transform an image of the second type (e.g., an ID document image) into an image of the first type (e.g., a portrait image). The training process will be discussed in more detail with respect to FIGS. 4 and 5.

At step 3, the data processing computer 104 may perform a verification process to verify the accuracy of the two transformation functions determined at step 2. The verification process may include utilizing the first transformation function to transform a first image of the first domain (e.g., a portrait image) to a second image of the second domain (e.g., an ID document image). The transformed image may then be provided as input for the second transformation function to transform the transformed image back to the first domain (e.g., back to a portrait image). The resultant image may be compared to the original image of the first domain to determine if the images match within some threshold degree. A similar process may be performed to verify the second transformation function by utilizing the second transformation function to transform an image of the second domain to the first domain and back. The resultant image may be compared to the original image to determine if the images match within some threshold degree. If both resultant images match the original image from their corresponding domains, the data processing computer 104 may consider the first and second transformation functions to be verified. If one or both of the resultant images fail to match the original images, the data processing computer 104 may continue training the cycleGAN to improve the accuracy of the transformation functions. This process may be further described in connection with FIG. 6.

Once the first and second transformation functions are verified (e.g., are accurate over a predetermined threshold amount), the data processing computer 104 may be configured to generate an augmented training data set at step 4. The augmented training data set may include pairs of images that are associated with one another. By way of example, each of the images of the first domain (e.g., portrait images) may be transformed to images of the second domain (e.g., ID document images) utilizing the first transformation function. Each of the images of the first domain may be associated/paired with the resultant image of the second domain obtained by applying the first transformation function to an image of the first domain. Similarly, each of the images of the second domain (e.g., ID documents) may be transformed to images of the first domain (e.g., portrait images) utilizing the second transformation function. Each of the images of the second domain may be associated/paired with the resultant image of the first domain obtained by applying the second transformation function to an image of the second domain. Each of the pairs discussed above may be labeled as being matching. In some embodiments, the data processing computer 104 may provide additional pairs of images, including an image of the first domain and an image of the second domain that are purposely mismatched. These pairs may be labeled as being mismatching. This augmented training data set of matched and mismatched pairs of images may be stored in the augmented training data set data store 110 which may be the same, or a different data store, than the training data set data store 108.

At step 5, the matching engine 106 (e.g., a component of the data processing computer 104 or another computing device) may obtain the augmented training data set from the augmented training data set data store 110 or directly from the data processing computer 104. In some embodiments, the matching engine 106 may be configured to utilize any suitable machine-learning algorithm to train a matching model to identify whether two input images match one another. In some embodiments, the matching engine 106 may utilize supervised learning techniques and the augmented training data set discussed above to identify when input images match one another.

Subsequently, at step 6, a user 103 may utilize the computing device 102 (or multiple computing devices) to collect input data such as input data A 112 and input data B 114. In some embodiments, input data A 112 may be an image of the user 103 (e.g., an image including some portion of the user's face). By way of example, the user 103 could utilize a camera of the computing device 102 to capture an image including at least some portion of his face (e.g., a "selfie" also referred to as a "self-captured portrait image"). In some embodiments, the computing device 102 may be owned and operated by the user 103, while in other examples, the computing device 102 may be provided by a different entity. The input data A 112 may be obtained by the user 103 themselves, or another person. The input data B 114 may be an image of an ID document (e.g., an image of a driver's license). The image of the ID document may include an image of a person. In some embodiments, the user 103 could utilize a camera and/or a scanner of the computing device 102 (or another computing device) to capture the input data B 114. If different computing devices are utilized, it should be appreciated that each computing device may be communicatively connected to the matching engine 106 via any suitable communications network (e.g., the Internet, Bluetooth®, a wireless communications network, a cellular communications network, etc.).

At step 7, the input data A 112 and the input data B 114 may be transmitted to the matching engine 106. In some embodiments, the matching engine 106 may be transmitted via an application programming interface when the matching engine 106 operates on the computing device 102. In other embodiments, the input data A 112 and the input data B 114 may be transmitted via any suitable communications protocol when the matching engine 106 operates on a device that is different than the computing device 102. In some embodiments, the matching engine 106 may operate on the data processing computer 104 (e.g., a server computer).

At step 8, the matching engine 106 may provide the input data A 112 and the input data B 114 as input into the matching model trained at step 5. The matching model may be configured to provide as output a determination that the two instances of input data (e.g., input data A 112 and input data B 114) match or do not match. As depicted an "accept" output indicates input data A 112 matches input data B 114 (e.g., the images are determined to depict the same person) and the "reject" output indicates input data A 112 does not match input data B 114 (e.g., the images are determined to depict different people, or at least not the same person). Although not depicted here, the matching engine 106 may be configured to provide output back to the computing device 102, which in turn can be configured to perform on or more operations. As a non-limiting example, the computing device 102 may be configured to provide a notification on the computing device 102 that the images match. In some embodiments, the computing device 102 can be configured to provide a code, an image, a bar code, or the like that, when read by another computing device (e.g., a security gate) may indicate that the person has verified themselves by providing a real time picture of themselves that matches the image provided on their ID document. Any suitable operation may be performed based on the output provided by the matching engine 106. In some embodiments, if it is determined that the images do not match one another, the user 103 may be denied access to an area (e.g., a boarding area of an airport), a service, a transaction (e.g., a purchase of a government controlled substance), or the like.

Figure 2:
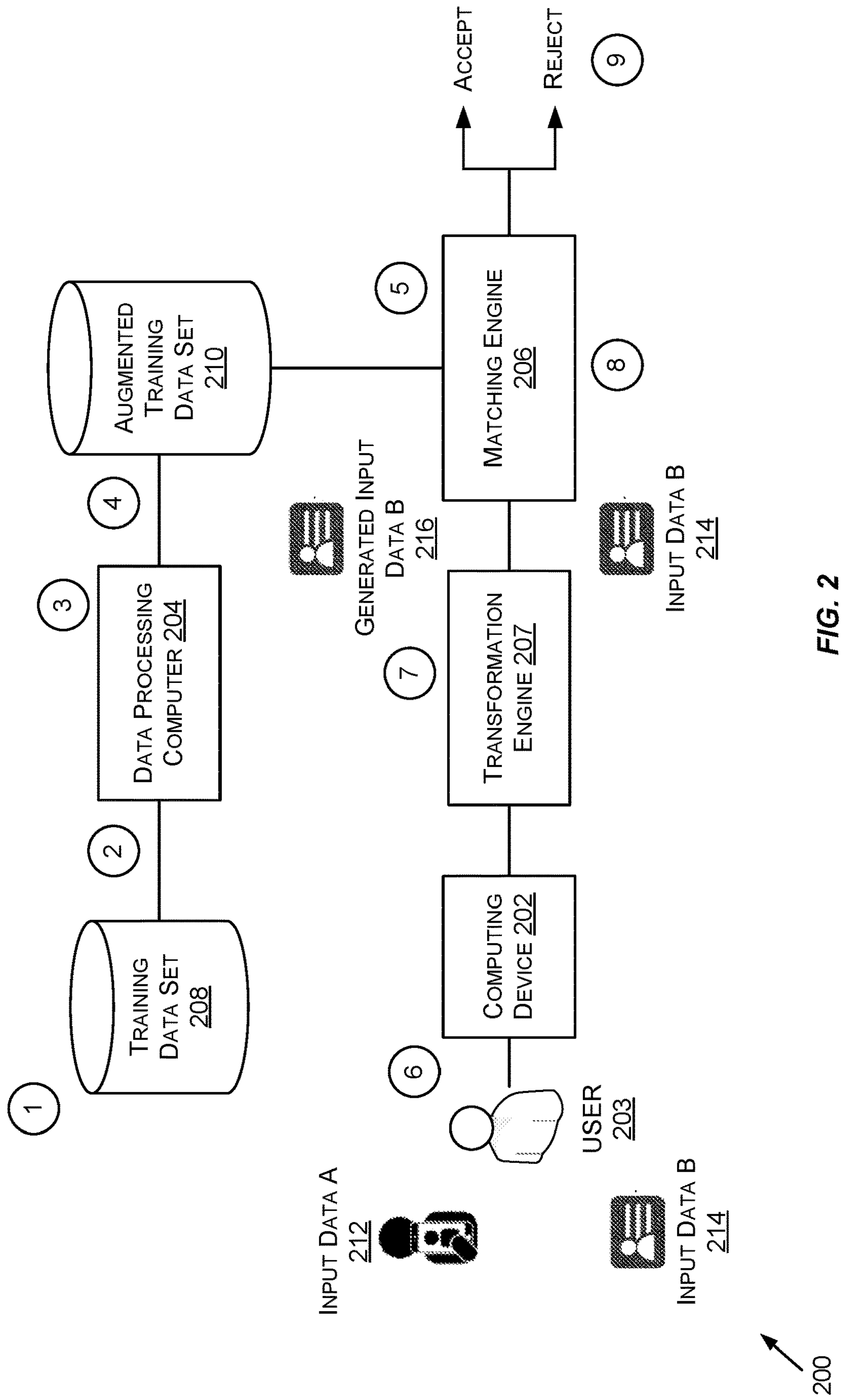
FIG. 2 shows a block diagram illustrating another exemplary system and method matching disparate input data, according to some embodiments.

FIG. 2 shows a block diagram of another exemplary system 200 and method for matching disparate input data, according to some embodiments. The system 200 may be similar to that of FIG. 1. The system 200 may be used to facilitate data communications between the various computers depicted in FIG. 2. The system 200 includes a computing device 202, a data processing computer 204, a matching engine 206, a training data set data store 208, and a augmented training data set data store 210. Each of the components 202-210 may be examples of the corresponding components of FIG. 1. In some embodiments, the matching engine 206 may be a component of the data processing computer 204. In the example depicted in FIG. 2, the transformation engine 207 may be a component of the data processing computer 204. The training data set data store 208 and the augmented training data set data store 210 may be the same data store or disparate data stores. In some embodiments, the computing device 202 and the data processing computer 204 may be one and the same. Each of these systems and computers may be in operative communication with each other. By way of example, these systems and computers may communicate via one or more data networks such as, but not limited to, the Internet, wireless communication networks, cellular communication networks, or the like. In general, the components in FIG. 2 may communicate via any suitable communication medium, using any suitable communications protocol. For simplicity of illustration, a certain number of components are shown in FIG. 2. It is understood, however, that embodiments of the invention may include more than one of each component. In addition, some embodiments of the invention may include fewer than or greater than all of the components shown in FIG. 2.

The computing device 202 may be in any suitable form. For example, the computing device 202 may be a smartphone, a personal digital assistant (PDA), a tablet computer, a laptop, a desktop computer, a digital camera, or the like. In some embodiments, the computing device 202 can be configured with, or configured to access, one or more image capture devices such as a camera, a scanner, or the like.

The data processing computer 204 may be an example of the data processing computer 204 of FIGS. 1 and 2. In some embodiments, the data processing computer 204 may be a server computer operated on behalf of an entity (e.g., a security organization at an airport or transit station, a merchant, a government agency, or the like). Utilizing the method discussed in connection with FIG. 2, a method for verifying whether two disparate input images match is provided.

The method may begin at step 1, where a training data set may be obtained and stored in the training data set data store 208. In some embodiments, the training data set may include a collection of images of a first type (e.g., images of people including at least a portion of the persons face (hereinafter referred to as "portrait images")). These images may be self-captured by the subject of the images (sometimes referred to as a "selfie") or the images may be captured by persons/devices different from the subject of the images. The training data set may further include a collection of images of a second type (e.g., ID documents or portions of ID documents including an image of a person). As used herein, ID documents are intended to refer to passports, driver's licenses, state-issued identification cards, debit and/or credit cards, or any suitable document that includes an image of the document holder. The training data set contained in the training data set data store 208 may include few or no image pairs. That is, the images of the first type may not be paired or otherwise associated with the images of the second type. The training data set may be provided by any suitable source (e.g., a user of the data processing computer 204). In some embodiments, the training data set may be obtained utilizing a web crawler or other data collection algorithm that can visit various websites on the Internet to identify images of people and/or images of ID documents. The number of portrait images need not equal the number of ID document images in the training data set, although these sets could have an equal number of images.

At step 2, the data processing computer 204 may retrieve the training data set and initiate a process for training a generative adversarial network such as a cycleGAN. Utilizing the training data set obtained from the training data set data store 208, the data processing computer 204 (e.g., the transformation engine 207) may train the cycleGAN to identify two transformation functions. One transformation function may specify operations to be performed to transform an image of the first type (e.g., a portrait image) into an image of the second type (e.g., an ID document image). The second transformation function may specify operations to be performed to transform an image of the second type (e.g., an ID document image) into an image of the first type (e.g., a portrait image). The training process may be similar to the process described above in connection with FIGS. 4 and 5.

At step 3, the data processing computer 104 may perform a verification process to verify the accuracy of the two transformation functions determined at step 2. The verification process may be may be similar to the verification process discussed above in connection with FIG. 6.

Once the first and second transformation functions are verified (e.g., are accurate over a predetermined threshold amount), the data processing computer 204 may be configured to generate an augmented training data set at step 5. The augmented training data set may include pairs of images that are associated with one another. By way of example, each of the images of the first domain (e.g., portrait images) may be transformed to images of the second domain (e.g., ID document images) utilizing the first transformation function. Each transformed image may be paired with another instance of the transformed image and labeled as matching. Each transformed image may be further paired with one of the original images of the second domain and labeled as being non-matching. Accordingly, the augmented training data set may include pairs of images of the second domain (e.g., ID document images), where some of the pairs include one or more images that were generated by transforming an image of the first domain to the second domain.

At step 5, the matching engine 206 (e.g., a component of the data processing computer 204 or another computing device) may obtain the augmented training data set from the augmented training data set data store 210 or directly from the data processing computer 204. In some embodiments, the matching engine 106 may be configured to utilize any suitable machine-learning algorithm to train a matching model to identify whether two input images match one another. In some embodiments, the matching engine 206 may utilize supervised learning techniques and the augmented training data set discussed above to identify when input images match one another. The training process utilized to train this matching model may be similar to the process 700 of FIG. 7.

Subsequently, at step 6, a user 203 may utilize the computing device 202 (or multiple computing devices) to collect input data such as input data A 212 and input data B 214. In some embodiments, input data A 212 may be an image of the user 203 (e.g., an image including some portion of the user's face). By way of example, the user 203 could utilize a camera of the computing device 202 to capture an image including at least some portion of his face (e.g., a "selfie" also referred to as a "self-captured portrait image"). In some embodiments, the computing device 202 may be owned and operated by the user 203, while in other examples, the computing device 202 may be provided by a different entity. The input data A 212 may be obtained by the user 203 themselves, or another person. The input data B 214 may be an image of an ID document (e.g., an image of a driver's license). The image of the ID document may include an image of a person. In some embodiments, the user 203 could utilize a camera and/or a scanner of the computing device 202 (or another computing device) to capture the input data B 214. If different computing devices are utilized, it should be appreciated that each computing device may be communicatively connected to the matching engine 106 via any suitable communications network (e.g., the Internet, Bluetooth®, a wireless communications network, a cellular communications network, etc.).

At step 7, the input data A 212 and the input data B 214 may be transmitted to the transformation engine 207. The transformation engine 207 may be configured to apply the first function to transform the input data A 212 to the generated input data B 216. Said another way, the input data A 212, an image of the first type/domain (e.g., a portrait image such as a selfie) can be transformed to the input data B 216 of the second type/domain (e.g., an ID document image generated from the portrait image). In some embodiments, the generated input data B 216 and the input data B 214 may both be of the second type/domain.

At step 8, the generated input data B 216 and the input data B 214 may be transmitted to the matching engine 206. In some embodiments, the matching engine 206 may be transmitted via an application programming interface when the matching engine 206 operates on the same device as the transformation engine 207. In other embodiments, the generated input data B 216 and the input data B 214 may be transmitted via any suitable communications protocol when the matching engine 206 operates on a device that is different than the computing device 202. In some embodiments, the transformation engine 207 and/or the matching engine 206 may operate at the computing device 202 and/or some portion of the transformation engine 207 and/or the matching engine 206 may operate at a server computer such as the data processing computer 204.

At step 9, the matching engine 206 may provide the generated input data B 216 and the input data B 214 as input data to the matching model trained at step 5. The matching model may be configured to provide as output a determination that the two instances of input data (e.g., generated input data B 216 and input data B 214) match or do not match. As depicted an "accept" output indicates generated input data B 216 matches input data B 214 (e.g., the images are determined to depict the same person) and the "reject" output indicates generated input data B 216 does not match input data B 214 (e.g., the images are determined to depict different people, or at least not the same person). Although not depicted here, the matching engine 206 may be configured to provide output back to the computing device 202, which in turn can be configured to perform one or more operations. As a non-limiting example, the computing device 202 may be configured to provide a notification on the computing device 202 that the images match. In some embodiments, the computing device 202 can be configured to provide a code, an image, a bar code, or the like that, when read by another computing device (e.g., a security gate) may indicate that the person has verified themselves by providing a real time picture of themselves that matches the image provided on their ID document. Any suitable operation may be performed based on the output provided by the matching engine 206. In some embodiments, if it is determined that the images do not match one another, the user 203 may be denied access to an area (e.g., a boarding area of an airport), a service, a transaction (e.g., a purchase of a government controlled substance), or the like.

An example of the data processing computer 104 of FIG. 1, according to an embodiment of the invention, is shown in FIG. 2. The data processing computer 104 may comprise the data store 104A, a processor 104B, a network interface 104C, and a computer readable medium 104D.

The computer readable medium 104D may comprise a number of components such as a processing module 104E, a transformation engine 104F, and a matching engine 104G. More or fewer components are contemplated. It should also be appreciated that the components depicted in FIG. 2 may be combined to perform the functionality described herein. The computer readable medium 104D may also comprise code, executable by the processor 104B for implementing the methods discussed herein.

In some embodiments, the data store 104A may be an example of the training data set data store 104H (e.g., an example of the training data set data stores 108 and 208 of FIGS. 1 and 2) and/or the augmented training data set data store 104I (e.g., an example of the augmented training data set data stores 110 and 210 of FIGS. 1 and 2). In some embodiments, the training data set data store 104H and/or the augmented training data set data store 104I may be external from but accessible to the data processing computer 104 and/or any suitable component thereof.

The processing module 104E may comprise code that, when executed, causes the processor 104B to receive an initial training data set. As described in FIGS. 1 and 2, the initial training data set may include a collection of images of a first type/domain and a collection of images of a second type/domain. In some embodiments, the processing module 104E may be configured to store the training data set in the training data set data store 104H. In some embodiments, the processing module 104E may be further configured to receive input data (e.g., two images). In some embodiments, the input data may be received utilizing the network interface 104C. In other embodiments, the processing module 104E may provide any suitable interface (e.g., an image capture interface, an application interface, etc.) with which input data may be received. The processing module 104E may be configured to cause the processor 104B to provide the input data to the transformation engine 104F.

In some embodiments, the transformation engine 104F may be configured to train one or more generative adversarial networks. By way of example, the transformation engine 104F may be configured to cause the processor 104B to utilize the training data set to train a generative model to generate images of the second type from images of the first type. The transformation engine 104F may further be configured to cause the processor 104B to execute operations to train a discriminator model to classify the generated images as "real" or "fake/generated." In a similar manner, the transformation engine 104F may be configured to cause the processor 104B to utilize the training data set to train a second generative model to generate images of the first type from images of the second type. The transformation engine 104F may further be configured to cause the processor 104B to execute operations to train a second discriminator model to classify the generated images generated by the second generative model as "real" or "fake/generated." The process for training these GANs may be discussed in more detail below in connection with FIGS. 4-6. Once trained, the transformation engine 104F may store the transformation functions of the first and second generative models. One transformation function may specify operations to be performed on an image of a first type/domain to transform the image to an image of the second type/domain. The second transformation function may specify operations to be performed on an image of a second type/domain to transform the image to an image of the first type/domain.

In some embodiments, the transformation engine 104F may be configured to cause the processor 104B to perform operations for generating an augmented data set. By way of example, the transformation engine 104F may cause the processor 104B to utilize each image of a first type/domain of the training data set and a first transformation function to generate corresponding images of the second type/domain.

The transformation engine 104F may be configured to cause the processor 104B to label corresponding image pairs as being a "match." Similarly, images of the second type/domain of the training data set may be transformed using the second transformation function to generate corresponding images of the first type/domain. These pairs may also be labeled as matching. The transformation engine 104F may be configured to cause the processor 104B to generate mismatch pairs by pairing an image of the first type/domain of the training data set with image of the second type obtained from the initial training data set (e.g., images of the second type that were not generated utilizing the first transformation function). In some embodiments, the transformation engine 104F may be configured to cause the processor 104B to store the resultant images (referred to herein as an "augmented training data set") in the augmented training data set data store 104I.

In some embodiments, the transformation engine 104F may be configured to cause the processor 104B to transform an input image of a pair of input images from a first type/domain to a second type/domain. The transformation engine 104F may be configured to cause the processor 104B to provide the transformed image of the second type as well the other image of the second type from the input images to the matching engine 104G.

In some embodiments, the matching engine 104G may be configured to cause the processor 104B to obtain an augmented training data set from the augmented training data set data store 104I and/or from the transformation engine 104F directly. In some embodiments, the matching engine 104G may be configured with code that, when executed, causes the processor 104B to train and/or maintain a matching model (e.g., the matching model 702 of FIG. 7). The matching engine 104G may be configured to cause the processor 104B to perform the training process 700 discussed in connection with FIG. 6 to train a matching model to identify whether or not two input images match. In some embodiments, the matching engine 104G may be configured to cause the processor 104B to transmit output (e.g., an indication of a match or mismatch) to any suitable computing system. In some embodiments, the matching engine 104G may cause the processor 104B to transmit the output via the network interface 104C. The network interface 104C may be any suitable interface corresponding to any suitable communications network such as the Internet, a cellular network, a wireless network, or the like.

Figure 4:
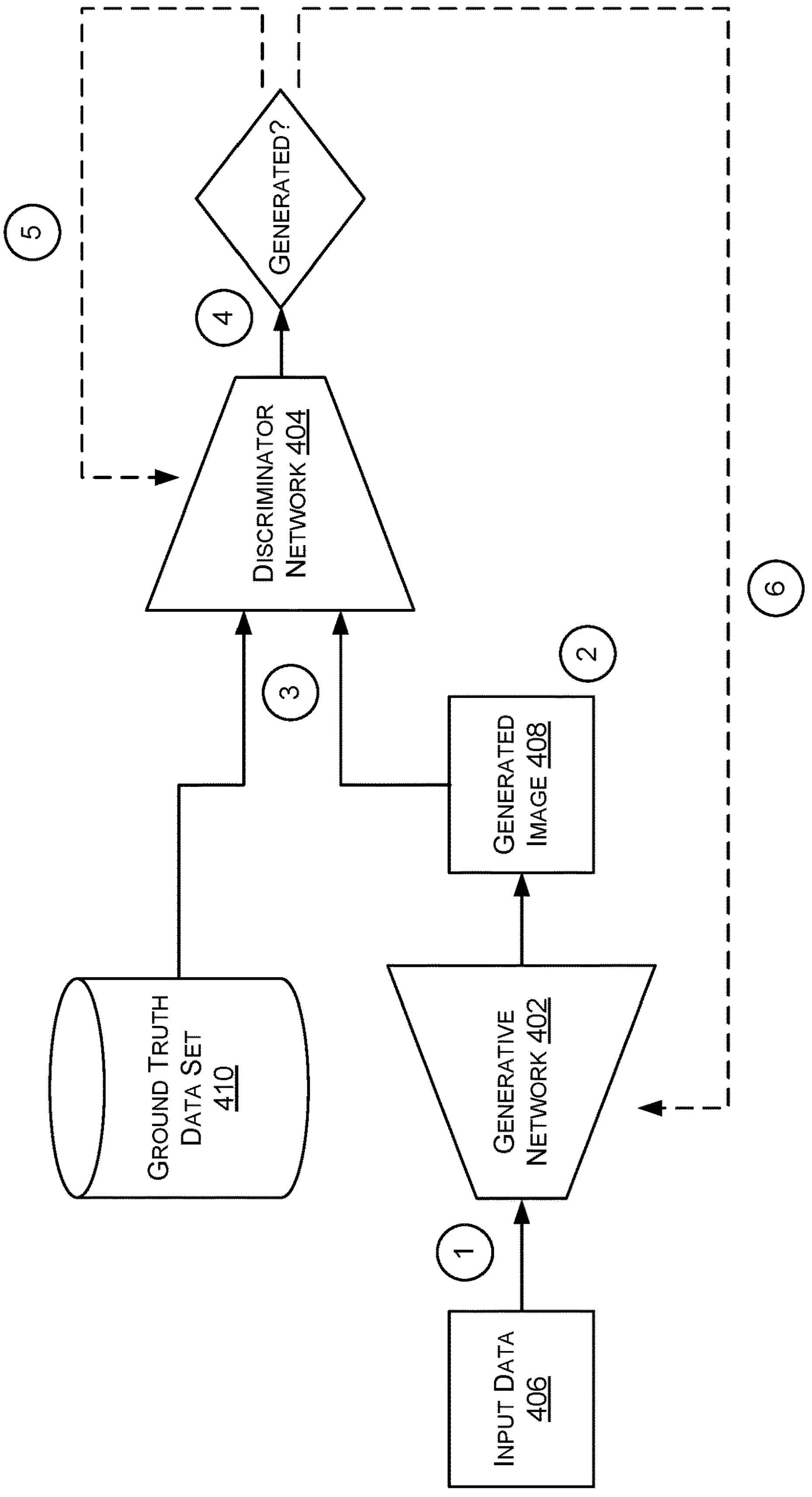
FIG. 4 shows a block diagram of an exemplary generative adversarial network.

FIG. 4 shows a block diagram of an exemplary generative adversarial network 400. The generative adversarial network 400 may be utilized to capture characteristics of images of a second domain in order to train a model (e.g., identify a transformation function) to transform an image from a first domain to the second, all without previously paired/labeled training examples. The generative adversarial network 400 includes a generative network 402 and a discriminator network 404. The generative network 402 and the discriminator network 404 may each be an example of a neural network. The generative network 402 can be trained to generate new images of a domain from input data 406. The discriminator network 404 may be trained to identify whether the generated image is real or fake (e.g., generated by the generative network 402).

At step 1, input data 406 may be used as input to the generative network 402. The input data 406 may correspond to a fixed-length vector of random noise. In some embodiments, the input data 406 may correspond to images of the first domain. The generative network 402 may utilize this random noise to generate an image (e.g., generated input data 408) at step 2. The generated input data 408 may be generated to be an example of an image of the second domain.

At step 3, the discriminator network 404 may obtain a ground truth data set 410. Ground truth data set 410 may include a collection of images of the second domain. The discriminator network 404 may be trained with the ground truth data set 410 to classify input images as being "real" (e.g., in the same domain of the ground truth data) or "fake" (e.g., not in the same domain as the ground truth data). The discriminator network 404 may be trained utilizing any suitable supervised or unsupervised machine-learning technique and the ground truth data set 410.

At step 4, the discriminator network may classify the generated image 408 as being "fake" (e.g., not of the first domain), or "real" (e.g., of the first domain). The determination of real (e.g., 1) or fake (e.g., 0) may be provided with the generated image 408 in two separate feedback loops. For example, at step 5, the output and generated image 408 may be provided to the discriminator network 404 as additional training data to improve the discriminator network's accuracy in identifying real versus fake images. The same output and generated image 408 may be provided back to the generative network 402 at step 6. This data may be utilized to improve the generative network's ability to generate better samples that more closely resemble other images in the first domain.

Steps 1-6 may be performed any suitable number of times to improve each of the networks of the generative adversarial network over time. The generative adversarial network can be thought of as a zero-sum problem. When the generative network 402 is able to fool the discriminator network 404, it is rewarded and/or the model parameters of the generative network 402 are unchanged, but the discriminator network 404 is penalized and its model parameters are updated. Thus, the networks of FIG. 4 run in competition with one another in the training phase.

Figure 3:
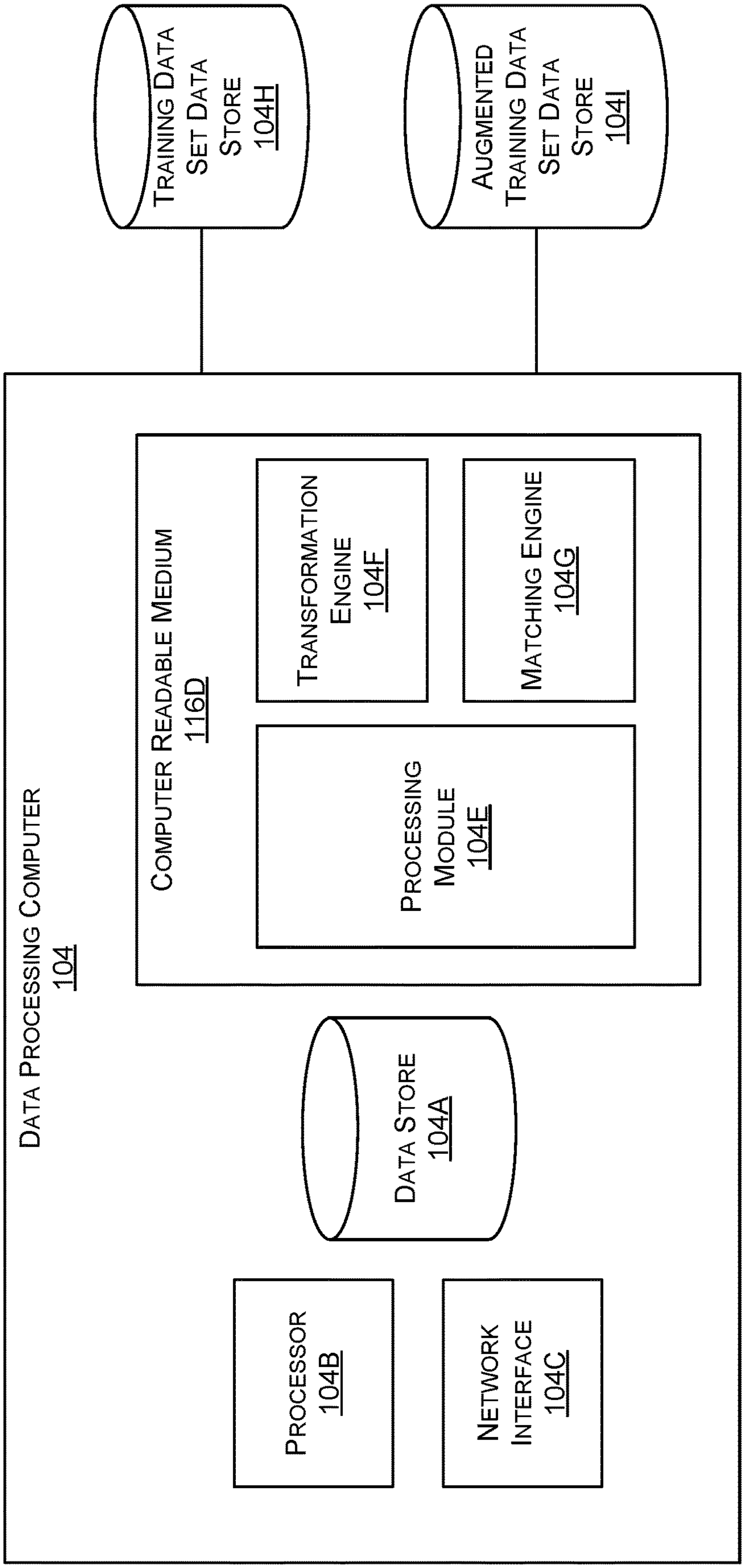
FIG. 3 shows a block diagram of an exemplary data processing computer, according to some embodiments.
Figure 5:
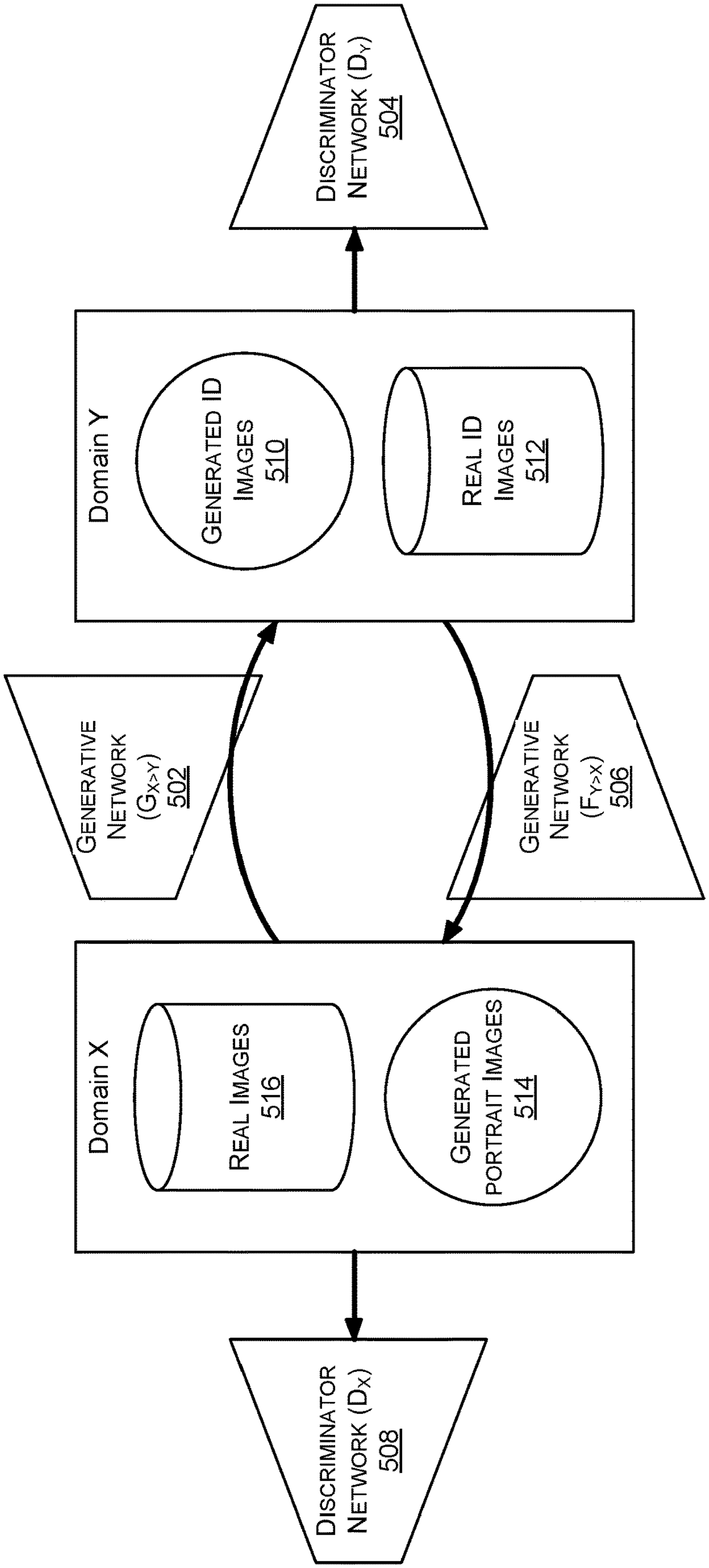
FIG. 5 shows a block diagram of an exemplary cycle generative adversarial network for generating image to image translations, according to some embodiments.

FIG. 5 shows a block diagram of an exemplary cycle generative adversarial network (cycleGAN) 500 for generating image to image translations, according to some embodiments. The cycleGAN 500 may be an example of the model trained by the transformation engine 207 of FIG. 2 and/or the transformation engine 104F of FIG. 3. The cycleGAN 500 may include two different generative adversarial networks (GANs). By way of example, a first generative adversarial network (GAN) may include the generative network 502 and the discriminator network 504. A second GAN may include the generative network 506 and the discriminator network 508. Each of the first and second GAN may be an example of the GAN 400 of FIG. 4.

In some embodiments, the generative network 502 may be configured/trained as described in FIG. 4 to generate images of domain Y (e.g., generated ID images 510). Domain Y may correspond to images of one type (e.g., ID document images, such as real ID images 512 that were not generated by the generative network 502, but rather were captured by a camera or a scanner). Discriminator network 504 may be configured/trained to classify images as being real (e.g., of domain Y) or fake (e.g., not of domain Y). The generative network 506 may be configured/trained as described in FIG. 4 to generate images of domain X (e.g., generated portrait images 514). Domain X may correspond to images of a second type (e.g., portrait images, such as real portrait images 516 that were not generated by the generative network 506, but rather captured with a camera). At any suitable time, the GANs may be validated.

Figure 6:
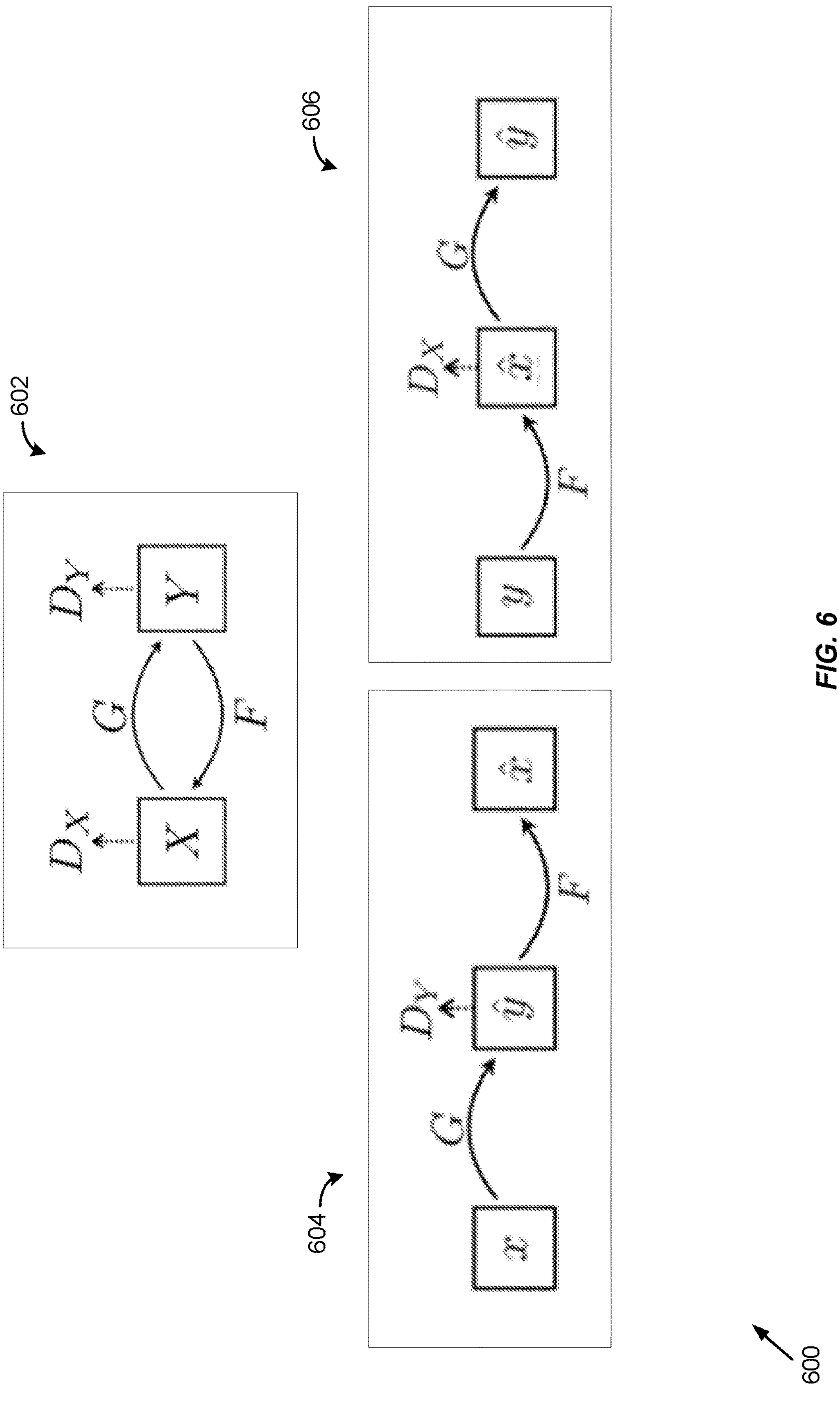
FIG. 6 shows a block diagram of an exemplary technique for validating two generative adversarial networks, according to some embodiments.

FIG. 6 shows a block diagram of an exemplary technique 600 for validating two generative adversarial networks (e.g., the GANs of FIG. 5), according to some embodiments. The function G may represent the transformation function provided by the generative network 502, while the function F may represent the transformation function provided by the generative network 506. The cycleGAN 500 is represented in simplistic form at 602.

In some embodiments, during the training stage of the cycleGAN 500, each of the real portrait images 516 (e.g., of which image x is an example) may be translated from domain X to domain Y using the transformation function G of generative network 502. This transformation produces image y. The transformed image may then be transformed back to domain X from domain Y utilizing the transformation function F of generative network 506. This transformation produces the image x. These transformations are depicted at 604. The image x and the image x at 604 may be compared. Similarly, each of the real ID images 512 (e.g., image y) may be translated from domain Y to domain X using the transformation function F of generative network 506. This transformation produces image x. The transformed image may then be transformed back to domain Y from domain X utilizing the transformation function G of generative network 502. This transformation produces the image y. These transformations are depicted at 606. The image y and the image y at 606 may be compared. It should be appreciated that x depicted at 604 and x depicted at 606 are not intended to depict the same image. Similarly, the image y at 604 and y at 606 are not intended to depict the same image. In some embodiments, a cycle consistency loss is applied to make sure that the transformed images preserve the information on the original image. The closer the resultant images (x at 604 and y at 606) match the original images (x and y, respectively), the more accurate the transformation functions of the generative networks 502 and 506 may be. When the resultant image matches the original images within some threshold, both GANs may be considered to be accurate enough for deployment/usage.

In some embodiments, the loss function applied may utilize distance as the cycle loss. However, in the problem of ID/portrait transformation, it may not be realistic to expect a high quality recovered portrait image from a compressed ID document image. Therefore, in some embodiments, a perceptual loss function may be utilized instead for the cycle consistency. It may be that some adversarial loss functions are known to suffer from the problem of mode collapse. Accordingly, in some embodiments, a Wasserstein Loss may be applied with a gradient penalty which can increase performance of the image generation tasks.

The technique described in FIG. 6 may be performed any suitable number of times as the cycleGAN 500 is trained to be increasingly more accurate.

Figure 7:
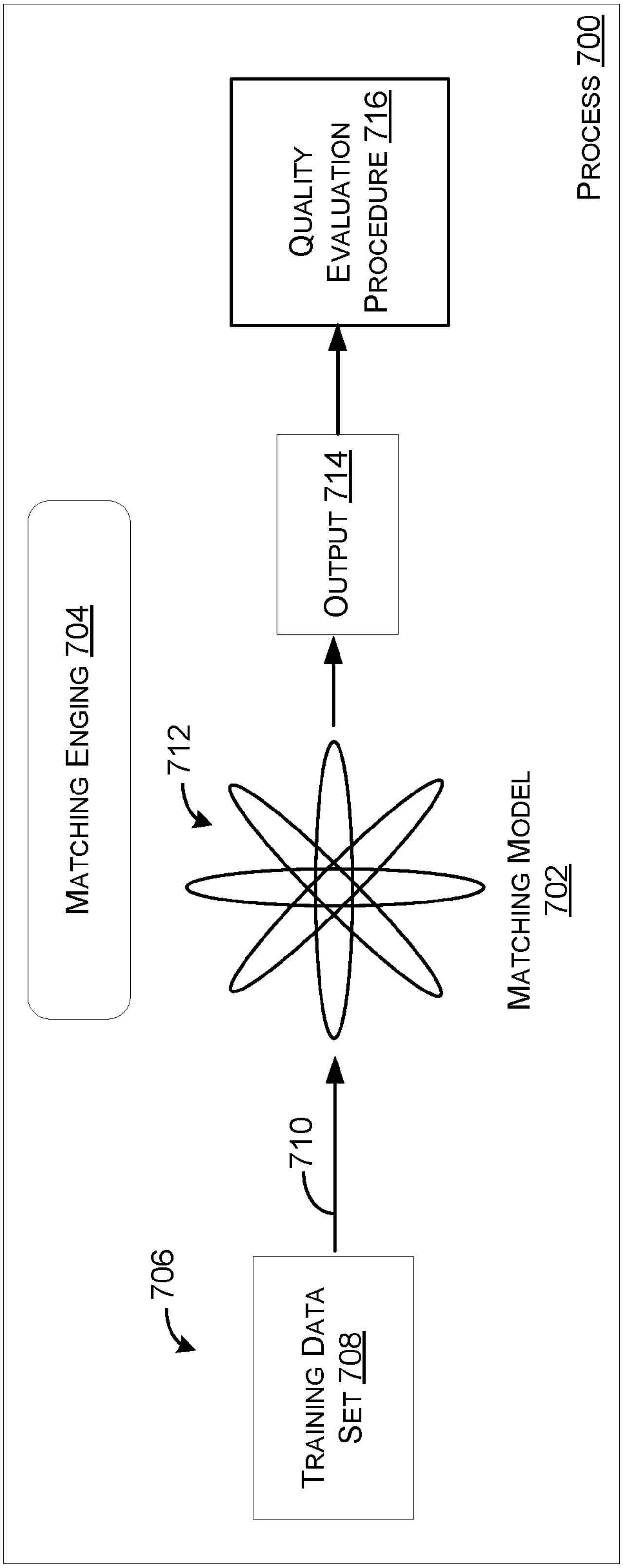
FIG. 7 shows a block diagram illustrating an exemplary process for training a matching model, according to some embodiments.

FIG. 7 illustrates an example process 700 for training a matching model 702, in accordance with at least one embodiment. The process 700 may be performed by the matching engine 704, an example of the matching engine 106 of FIG. 1, matching engine 206 of FIG. 2, and/or matching engine 104G of FIG. 3.

In some embodiments, process 700 may begin at 706, where the matching engine 704 (or a component thereof) may obtain training data set 708. Training data set 708 may include any suitable data with which matching model 702 may be trained to identify whether two input images match. By way of example, training data set 708 may include an augmented training data set such as the ones discussed in connection with FIGS. 1 and 2. In some embodiments, the training data set 708 may include pairs of images including an image of a first type/domain (e.g., a portrait image) and an image of a second type/domain (e.g., an ID document image). In some embodiments, the image of the second type/domain of some pairs may be generated from the corresponding image of the first type/domain (e.g., a corresponding portrait image). In other embodiments, the training data set 708 may include pairs of images that include two images of a same type/domain (e.g., a second type/domain such as an ID document image). In some embodiments, at least one of these pairs may be an image of a second type that was generated from an image of the first type utilizing a transformation function as described above. In either scenario, some pairs may be labeled as being matching while other are labeled as being mismatched/non-matching.

Any suitable portion of the training data set 708 may be submitted at 710 and utilized to train the matching model 702 at 712. In some embodiments, the training may utilize any suitable supervised machine-learning technique. A supervised machine-learning technique is intended to refer to any suitable machine-learning algorithm that maps an input to an output based on example input-output pairs. A supervised learning algorithm (e.g., decision trees, Bayes algorithms, reinforcement-based learning for artificial neural networks, distance functions such as nearest neighbor functions, regression algorithms, etc.) may analyze training data and produce an inferred function (also referred to as "a model"), which can be used to identify an output (e.g., output 714) for a subsequent input. Accordingly, by executing the supervised learning algorithm on the training data set 708, the matching model 702 may be trained to identify whether two input images match (or do not match). As an example, the output 714 may include an "accept" or "reject" value corresponding to a "match" or "mismatch" determination, respectively.

Once trained, or at any suitable time, the matching model 702 may be evaluated to assess the quality (e.g., accuracy) of the model. By way of example, quality evaluation procedure 716 may be executed. In some embodiments, quality evaluation procedure 716 may include providing pairs of the training data set 708 to the model to identify whether the output 714 correctly labels the pair as matching (e.g., indicated with an "accept" output) or mismatching (e.g., indicated with a "reject" output). The output 714 may be compared to the labels provided in the training data set 708 to identify how many outputs of the model were accurate. For example, if 90 out of 100 of the outputs (e.g., match/mismatch determinations) accurately reflect the label provided in the training data set 708, the matching model 702 may be determined to be 90% accurate. In some embodiments, as the matching model 702 is utilized for subsequent previously unlabeled input image pairs, the subsequent image pairs and corresponding output label may be added to the training data set 708 and used to retrain and/or adjust the matching model 702 (e.g., by completely retraining the matching model 702 or by performing an incremental update of the matching model 702). In some embodiments, the subsequent image pairs and corresponding output label may not be added to the training data set 708 until a user (e.g., an administrator, etc.) identifies that label as being correct for particular image pairs.

The process 700 may be performed any suitable number of times at any suitable interval and/or according to any suitable schedule such that the accuracy of matching model 702 is improved over time.

Technical Improvements

By utilizing the techniques described herein, matching models may be trained to identify matches between portrait images and ID document images and/or between ID document images generated from portrait images and actual ID document images. Although training data sets to train these models may be unavailable or difficult to procure, a cycle-GAN may be utilized to learn transformation functions for transforming images from one domain (e.g., a portrait image domain) to the other (e.g., an ID document image domain), and vice versa. Accordingly, portrait images which are far more readily available than ID document images may be utilized to generate training data sets to train the matching models discussed herein.

Any of the computing devices described herein may be an example of a computer system that may be used to implement any of the entities or components described above. The subsystems of such a computer system may be are interconnected via a system bus. Additional subsystems include a printer, keyboard, storage device, and monitor, which is coupled to display adapter. Peripherals and input/output (I/O) devices, which couple to I/O controller, can be connected to the computer system by any number of means known in the art, such as a serial port. For example, I/O port or external interface can be used to connect the computer apparatus to a wide area network such as the Internet, a mouse input device, or a scanner. The interconnection via system bus may allow the central processor to communicate with each subsystem and to control the execution of instructions from system memory or the storage device, as well as the exchange of information between subsystems. The system memory and/or the storage device may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A computer-implemented method, comprising:

receiving, by a data processing computer, input data comprising a first input image and a second input image for processing by a machine-learning model, wherein the first input image is a captured user image of a first type that is captured in a real time, the machine-learning model formed by:

(i) obtaining, by the data processing computer, an initial training set comprising a first set of original first images of the first type and a second set of original second images of a second type, (ii) training a neural network using the initial training set by:

determining a first transformation function for generating images of the second type from the original first images of the first type, determining a second transformation function for generating images of the first type from the original second images of the second type, verifying the first transformation function by (a) using the first transformation function to transform an original first image of the first type to a transformed image of the second type, (b) providing the transformed image of the second type as an input to the second transformation function to transform the transformed image of the second type to a transformed image of the first type, (c) applying a perceptual loss function on the transformed image of the first type and the original first image of the first type, and (d) determining whether the transformed image of the first type matches the original first image of the first type within a first threshold, verifying the second transformation function by (e) using the second transformation function to transform an original second image of the second type to a transformed image of the first type, (f) providing the transformed image of the first type as an input to the first transformation function to transform the transformed image of the first type to a transformed image of the second type, (g) applying a perceptual loss function on the transformed image of the second type and the original second image of the second type, and (h) determining whether the transformed image of the second type matches the original second image of the second type within a second threshold, wherein the first transformation function and the second transformation function are verified when the transformed image of the first type matches the original first image of the first type within the first threshold and the transformed image of the second type matches the original second image of the second type within the second threshold, and stopping the training the neural network when the first transformation function and the second transformation function are verified, wherein the neural network is different from the machine-learning model, (iii) in response to the first transformation function and the second transformation function being verified, generating, by the data processing computer using the neural network that is trained, an augmented training data set by applying the first transformation function on the original first images from the first set to generate second generated images of the second type, applying the second transformation function on the original second images from the second set to generate first generated images of the first type, associating the second generated images with matching original first images from the first set, to create first pairs of matching images, associating the first generated images with matching original second images from the second set, to create second pairs of matching images, wherein each of the first pairs and each of the second pairs is labeled as match examples, generating at least one mismatched pair of images by associating at least one second image of the second type and at least one first image of the first type that are obtained from the initial training set and do not match, wherein the at least one second image of the second type and the at least one first image of the first type are not generated by the neural network, and generating the augmented training data set to include the first pairs, the second pairs, and the at least one mismatched pair, and (iv) training the machine-learning model to identify whether two input images match or not, using the augmented training data set comprising the first pairs, the second pairs, and the at least one mismatched pair;

transforming the first image using the first transformation function to a transformed user image of the second type;

providing, by the data processing computer as an input to the machine-learning model, the transformed user image of the second type and the second input image, to determine whether the first input image matches the second input image;

determining, by the machine-learning model, whether the first input image matches the second input image based on the transformed user image of the second type and the second input image; and executing, by the data processing computer, at least one operation in response to receiving output of the machine-learning model indicating the first input image matches the second input image.

2. The computer-implemented method of claim 1, wherein the neural network is a cycle-consistent generative adversarial network, and wherein the training the neural network further comprises:

training a first neural network to generate the second generated images of the second type from the original first images of the first set; and training a second neural network to generate the first generated images of the first type from the original second images of the second set.

3. The computer-implemented method of claim 1, wherein, in the initial training set, the original first images of the first type are unpaired with the original second images of the second type.

4. The computer-implemented method of claim 1, wherein the original first images comprise user captured self-portrait images and the original second images comprise images captured from an identification card.

5. The computer-implemented method of claim 1, wherein the neural network is a cycle-consistent generative adversarial network.

6. A data processing computer, comprising:

one or more processors; and one or more memories storing computer-executable instructions, wherein executing the computer-executable instructions by the one or more processors causes the data processing computer to:

receive input data comprising a first input image and a second input image for processing by a machine-learning model, wherein the first input image is a captured user image of a first type that is captured in a real time, the machine-learning model formed by:

(i) obtaining an initial training set comprising a first set of original first images of the first type and a second set of original second images of a second type, (ii) training a neural network using the initial training set by:

determining a first transformation function for generating images of the second type from the original first images of the first type, determining a second transformation function for generating images of the first type from the original second images of the second type, verifying the first transformation function by (a) using the first transformation function to transform an original first image of the first type to a transformed image of the second type, (b) providing the transformed image of the second type as an input to the second transformation function to transform the transformed image of the second type to a transformed image of the first type, (c) applying a perceptual loss function on the transformed image of the first type and the original first image of the first type, and (d) determining whether the transformed image of the first type matches the original first image of the first type within a first threshold, verifying the second transformation function by (e) using the second transformation function to transform an original second image of the second type to a transformed image of the first type, (f) providing the transformed image of the first type as an input to the first transformation function to transform the transformed image of the first type to a transformed image of the second type, (g) applying a perceptual loss function on the transformed image of the second type and the original second image of the second type, and (h) determining whether the transformed image of the second type matches the original second image of the second type within a second threshold, wherein the first transformation function and the second transformation function are verified when the transformed image of the first type matches the original first image of the first type within the first threshold and the transformed image of the second type matches the original second image of the second type within the second threshold, and stopping the training the neural network when the first transformation function and the second transformation function are verified, wherein the neural network is different from the machine-learning model, (iii) in response to the first transformation function and the second transformation function being verified, generate, using the neural network that is trained, an augmented training data set by:

applying the first transformation function on the original first images from the first set to generate second generated images of the second type, applying the second transformation function on the original second images from the second set to generate first generated images of the first type, associating the second generated images with matching original first images from the first set, to create first pairs of matching images, associating the first generated images with matching original second images from the second set, to create second pairs of matching images, wherein each of the first pairs and each of the second pairs is labeled as match examples, generating at least one mismatched pair of images by associating at least one second image of the second type and at least one first image of the first type that are obtained from the initial training set and do not match, wherein the at least one second image of the second type and the at least one first image of the first type are not generated by the neural network, and generating the augmented training data set to include the first pairs, the second pairs, and the at least one mismatched pair, and (iv) train the machine-learning model to identify whether two input images match or not, using the augmented training data set comprising the first pairs, the second pairs, and the at least one mismatched pair;

transform the first image using the first transformation function to a transformed user image of the second type;

provide, as an input to the machine-learning model, the transformed user image of the second type and the second input image, for determining, by the machine-learning model, whether the first input image matches the second input image based on the transformed user image of the second type and the second input image; and execute at least one operation in response to receiving output of the machine-learning model indicating the first input image matches the second input image.

7. The data processing computer of claim 6, wherein executing the computer-executable instructions by the one or more processors further causes the data processing computer to collect the original first images utilizing a web crawler.

8. The data processing computer of claim 6, wherein training the neural network includes applying an adversarial loss function.

9. The data processing computer of claim 6, wherein the neural network comprises at least two generative networks and at least two corresponding discriminator networks.

10. The data processing computer of claim 6, wherein the input data is received from an interface provided by the data processing computer.

11. The data processing computer of claim 6, wherein the input data is received from a computing device different from the data processing computer.

12. The data processing computer of claim 6, wherein the first type corresponds to a portrait image, and the original first images are portrait images.

13. The data processing computer of claim 6, wherein the second type corresponds to an ID document image, and the original second images are ID document images.

14. The data processing computer of claim 6, wherein each of the original first images and each of the original second images comprises at least some portion of a subject's face.

15. The data processing computer of claim 6, wherein executing the at least one operation includes at least one from among approving a transaction and enabling access to a resource or a location.

* * * * *